March 4, 1969     S. NELLIS ET AL     3,431,348
ELECTROMAGNETIC SHIELD AND VIEWING LAMINATE
Filed May 6, 1966
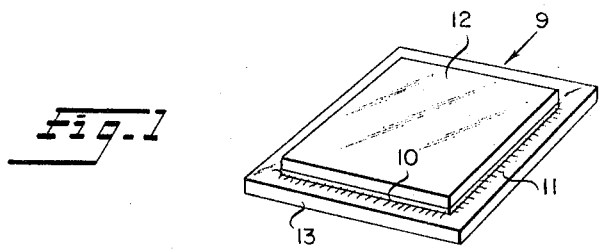
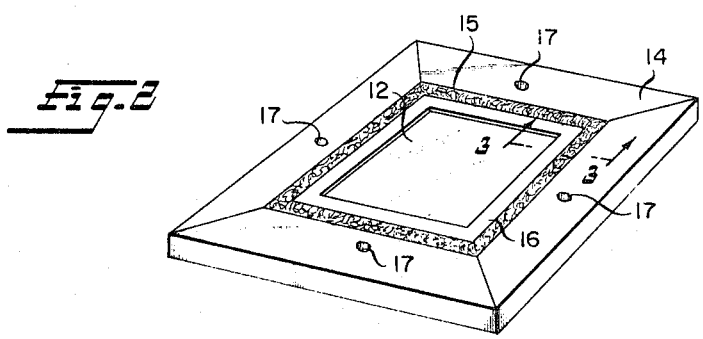
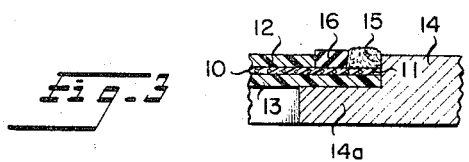
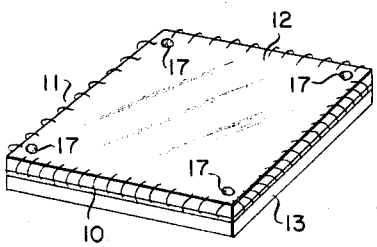
INVENTORS
Stewart Nellis
Richard W. Lamp
BY
Littlepage & Quaintance
ATTORNEYS

3,431,348
ELECTROMAGNETIC SHIELD AND VIEWING LAMINATE

Stewart Nellis, Watchung, and Richard W. Lamp, Verona, N.J., assignors to Technical Wire Products, Inc., Cranford, N.J., a corporation of New Jersey
Filed May 6, 1966, Ser. No. 548,150
U.S. Cl. 174—35
Int. Cl. H05k 9/00
4 Claims

ABSTRACT OF THE DISCLOSURE

Electromagnetic shielding laminates are described herein which have transparent outer laminae and a transparent inner lamina having an imbedded metallic screen with the screen extending beyond a periphery of one of the outer laminae so that it may bend around the periphery and overlap an outer surface of the laminate, and which have outer laminae of varied size with an imbedded screen overlying an exposed peripheral shoulder of a larger outer lamina and with a resilient conductor overlying the exposed screen and shoulder and extending perpendicularly therefrom beyond the smaller outer lamina.

---

This invention relates to an electromagnetic interference shield and a viewing laminate and to its production.

Today, with incursions into space involving the necessity to save space and weight and the resulting microminiturization of sophisticated types of electronic equipment for use in close proximity to one another for communication and control, the proper and effective shielding of such equipment against the unwanted ingress or egress of electromagnetic energy is a universally recognized problem. Illustrative instances of such problems are set out in Hartwell, U.S. Patent #3,019,281.

Often, it is highly desirable, or even necessary, to observe the performance of such equipment from outside the cabinet or other housing therefor. This necessitates the use of a translucent or transparent viewing panel or window. The provision of such windows, however, requires the juxtapositioning, or abutting, of one surface relative to another which necessarily creates problems of shielding the cabinet, or the like against the undesired ingress or egress of electromagnetic wave energy. Thus, it is highly desirable to have a viewing panel, or window, which not only serves the viewing function but also serves to shield the equipment against such undesired ingress or egress of electromagnetic energy. Due to the great variety of equipment used, it is important that any such electromagnetic interference shielding and viewing panel be easy to fabricate so as to permit one to provide the great variety of sizes and shapes required in such viewing panels. So far as known, no wholly satisfactory, uncomplicated and inexpensive viewing panel has been provided which serves both a viewing function and a shielding against interference from electromagnetic energy, i.e., electromagnetic energy interferences (E.M.I.) such, for instance, as radio frequency interference (R.F.I.).

It is an important object of this invention to provide a versatile, easily fabricated and relatively inexpensive E.M.I. shield and viewing panel.

It is a more particular object of the invention to provide a novel and highly effective E.M.I. shield and viewing laminate.

It is a special object of the invention to provide such a viewing and shielding laminate possessing superior optical properties, and exceptional stability against deterioration attributable to chemical or physical factors.

It is another special object of the invention to provide a method by which desired laminae varying widely in coefficients of expansion may be used in the same laminate.

The foregoing and other advantages will become apparent from the more detailed description of the invention which follows.

It is yet another special object of the invention to provide a fabricating method and a fabricated article in which markings, or scales, may be easily provided and preserved during use.

In its preferred embodiment, the invention provides an E.M.I. shielding and viewing laminate comprising outer laminae of relatively rigid and mar resistant material and an interlamina of an elastic material containing embedded therein a wire screen when which extends around and beyond the periphery of at least one of the outer laminae a distance sufficient to provide for ready electrical contact. Of course, it is understood all the laminae must be translucent or transparent if proper viewing is to take place and such attributes are designated herein as "translucent to transparent." While the objectives of this invention are readily obtained by using a sandwich type laminate with a translucent or transparent flexible lamina sandwiched between two outer laminae, it will be understood that any number of alternating elastic and relatively rigid lamina may be used provided the outer laminae are relatively rigid. It will be understood lamina is used herein in the conventional sense to designate a continuous and uninterrupted layer, or plate, of material.

Quite a variety of translucent, or transparent, materials having good optical qualities and good physical and chemical attributes are known and can be used for the outer laminae but glass and acrylic resins are preferred. Sheets of acrylic resins having good optical qualities are readily available, for instance from Rohm and Haas Company of Philadelphia, Pa., under the trademark Plexiglas, or from the E. I. du Pont de Nemours Co. Inc., of Wilmington, Del., under the tradename Lucite. As is known, these are the methacrylate alkyl esters polymers but other types of acrylic resins may be used such as those derived from acrylonitrile, or the like. Sheets of other known types of clear or transparent resins may be used such as those deived from the alpha olefins including styene, other vinyl resins such as vinyl chloride homo- or heteropolymers, cellulosic resins, etc.

The interlamina should be elastic so as to impart good physical properties to the laminate and should be obtainable from a fluid phase which is easily convertible into a phase which is no longer fluid so as to facilitate the embedding of the conductive wire screen and the fabrication of the laminate and, of course, in the non-fluid, or solid, phase must be translucent or transparent. Liquid, or fluid, silicone prepolymers which can be cured, or vulcanized, at room, or other, temperatures have proven to have good physical properties for use in fabrication of the laminate and, upon polymerizing, or curing, have proven to process exceptionally good physical and chemical attributes and bonding properties. Such prepolymers are readily available from General Electric Company, Silicone Products Division, Waterford, N.Y., under the trademark of RTV or LTV silicones. Like products are available from Union Carbide, Silicones Division, New York, N.Y., or from Dow Corning Corporation, Midland, Mich. It will be apparent that other known transparent elastomers, or flexible and elastic plastics, which are available as liquid prepolymers, or can be converted into a liquid phase after being polymerized, may be used as interlamina in place of the silicones. Such elastic material will be found among those used, or suggested for use, in fabricating so-called safety glass.

In fabricating the shielding and viewing panels of this invention, one normally buys outer laminae of the type and contour desired. For instance, the outer laminae may be flat sheets or plates or they may have a desired curved contour. The laminae may be bought pre-cut or may be cut to the desired shape and size after being bought. Although the outer laminae normally are bought due to economic considerations, they could be cast by those using them, for techniques for doing so are well known.

Assuming that the outer laminae having the desired physical and chemical properties have been selected and cut to a desired configuration and a silicone polymer is to be used as an interlamina, it is only necessary to position an incompletely cured silicone resin with the conductive wire embedded therein between superimposed outer laminae (as in a sandwich), being careful to see that the wire extends around and beyond at least one of the outer laminae, and then let the resin cure in situ. Assuming, for instance, one were using a liquid prepolymer, one could either use a form for fabricating the laminate or one could embed the wire in the liquid, partially cure the silicone until it no longer flowed and then position the laminae upon one another and complete the cure. The incompletely cured, or cured, silicone may be easily removed from the wire extending beyond an outer lamina of the laminate to bare the wire or the silicone prepolymer (i.e., incompletely cured, or partial, polymer) may be applied only to desired parts of the wire screen. Since, in use, the laminate normally will be under pressure, inter-surfacial adhesion customarily is not a problem. However, adhesives and primers are well known which will enable one to create any desired bond strength between a silicone interlamina and outer laminae such as glass or acrylic resin sheets.

As stated, silicone resin prepolymers are well known and are readily available in various viscosities, and even as pastes. The producers of such prepolymers provide appropriate catalyst together with instructions for casting and curing the prepolymers once the catalysts have been incorporated therein. Those familiar with optics will recognize the importance of seeing that the laminate does not contain bubbles so one must be careful to see that the surfaces facing the interlamina are thoroughly cleaned and that the interlamina is so thoroughly deareated that it too is free of bubbles.

The nature of the E.M.I. shielding and viewing panels of this invention and the features characteristic thereof will be further understood from a consideration of illustrative panels represented in the drawings attached hereto.

In the drawings:

FIGURE 1 is a perspective view of laminated sandwich of the invention comprising a wire mesh embedded in a transparent elastic body and sandwiched between two firm and rigid sheets of a translucent or transparent material such that one sheet is slightly larger than the other;

FIGURE 2 illustrates the sandwich of FIG. 1, positioned in a frame and provided with a fluid sealing and electrical shielding gasket positioned on the shoulder of the larger outer lamina;

FIGURE 3 is a cross-sectional view of FIG. 2 along line 3—3 thereof;

FIGURE 4 is a perspective view of an alternative embodiment of the invention showing the sandwich of FIG. 1 in which the two outer rigid sheets are of the same size and where the wire mesh extends out over the outer surface of one of the outer laminae.

As illustrated in FIGURE 1 of the drawings, the viewing panel 9, which is adapted to act as an E.M.I. shield for the space between the viewing panel and the cabinet, or like enclosures for electronic equipment, to which it is to be attached, comprises: an interlamina of silicone 10, containing embedded therein a knitted conductive wire 11, and, two outer laminae, 12 and 13, formed from sheets of clear acrylic resin in which lamina 12 is somewhat smaller than lamina 13. As is known, the shielding knitted wire may be flat knit or tubular knit and flattened to provide a mesh sheet of the desired ply. The size of the wire and its mesh is selected in conformity with the intended use and is not a part of the instant invention. While, as illustrated, both laminae 12 and 13 are made of clear acrylate sheet material, if either were likely to be scratched, it would be made of glass. It has been found that glass and clear acrylic resin sheets can be bound together with an interlamina of a cured silicone resin and subjected to wide temperature variations without any crazing taking place and without any other impairments in the optical qualities of the laminate even though substantial differences exist between the coefficients of expansion of the glass and the acrylic resin. It will be observed bare, or uncoated knitted wire mesh 11 extends beyond the periphery of the smaller outer lamina 12 to slightly beyond the periphery of the larger outer lamina 13 for reasons which will be explained later.

As illustrated in FIGURES 2 and 3, the fully laminated and strongly bonded sandwich is positioned in a metal mounting frame 14 provided with a retaining shoulder 14a. Aluminum frames are preferred due to their light weight, good physical properties, and excellent electrical conductivity. A strip of a suitable electrically conductive material, preferably a strip of a knitted wire mesh of desired wire gauge 15, is positioned around the periphery of lamina 12 overlying the bare knitted wire resting on lamina 13. The depth of the wire strip 15 is selected so that the strip protrudes slightly above the upper surface of lamina 12 and frame 14. It will be apparent that this shielding metallic strip 15 forms a good continuous conductive contact with the portions of wire mesh 11 extending beyond the periphery of lamina 12 and overlying lamina 13 and with any surface upon which frame 14 may be mounted. Also, a fluid seal 16 of a suitable resilient material, such as a natural or synthetic rubber gasket, is adhesively attached along the inner periphery of the shielding member 15, as shown in FIG. 3, so that it also extends slightly above the surface of lamina 12 and frame 14. This insures substantially total exclusion of outside moisture and dust particles from any enclosure for electronic equipment when the frame 14 is mounted thereon. As illustrated, the viewing window is shown to be flat and square in shape but it may be curved to fit a porthole or may be of any other desired shape and size.

Also, the frame 14 is provided with means for mounting it on an enclosure. As shown, the frame can be mounted by screwing it onto an enclosure by screws inserted through holes 17 provided therefor. However, the provision of these holes or slots is of no criticality to this invention for other conventional mounting means could be used.

In an alternate embodiment shown in FIGURE 4, the two rigid outer sheets 12 and 13 of the sandwich 9, 13 being glass, are of the same size. The wire gauge of lamina 10 is of such a size that bare portions thereof extend beyond the periphery of the sandwich a sufficient distance to permit its overlapping the outer surface of at least one of the outer laminae 12 or 13. These bare ends of the wire mesh are bent over on one of the outer sheets, say on 12 as shown in FIGURE 4. Sandwich 9 is provided with holes 17 so that it may be mounted on an enclosure without the use of an auxiliary frame. Of course, a rubber gasket could be used to form a fluid seal between the viewing panel 9 and any enclosure upon which it may be mounted.

The embodiments specifically illustrated have an unusual combination of attributes such as freedom from deterioration by exposure to moisture, freedom from light distortions, full protection for scales inserted between, or within, the laminae, freedom from distortion due to vibrations and thermal shock, high resistance to chemical attack, exceptional stability during use, etc.

It will be understood that "wire screen" is used herein in a generic sense to include both knitted and woven metal wire and honeycomb or expanded metal for it is apparent the principles of the invention apply equally as well to such materials.

While the invention has been described by reference to its best presently known embodiments, it will be understood the invention and its principles can be practiced in ways not specifically illustrated and still be within the scope of the invention and its principles as defined in the appended claims.

What is claimed is:

1. An E.M.I. shield and viewing laminate comprising relatively rigid translucent to transparent outer laminae and an elastic translucent to transparent interlamina having imbedded therein a conductive screen, said screen having exposed and unembedded portions thereof extending beyond at least one of said outer laminae and around the periphery thereof, wherein the conductive screen extends beyond the periphery of one of the outer laminae and wherein the screen is bent around the periphery of one of the outer laminae and overlaps an outer surface thereof, to provide conductive contact about a peripheral portion of a surface of an outer lamina.

2. An E.M.I. shield and viewing laminate comprising relatively rigid translucent to transparent outer laminae and an elastic translucent to transparent interlamina having imbedded therein a conductive screen, said screen having exposed and unembedded portions thereof extending beyond at least one of said outer laminae and around the periphery thereof, wherein one outer lamina is larger than the other and bare exposed portions of the screen overlie the larger lamina, and wherein a resilient conductor having a height at least slightly greater than the thickness of the smaller outer lamina is positioned around the smaller outer lamina on the exposed shoulder of the larger outer lamina in contact with the exposed screen, to provide for electrical contact with said screen.

3. The laminate of claim 2 mounted in a metal frame with said resilient conductor extending beyond the face of the frame.

4. The mounted laminate of claim 2, wherein a resilient fluid seal is mounted on the shoulder of the larger outer lamina around the smaller lamina so as to extend beyond said face.

References Cited

UNITED STATES PATENTS

| | | | |
|---|---|---|---|
| 2,405,987 | 8/1946 | Arnold | 174—35 |
| 2,958,754 | 11/1960 | Hahn | 219—10.55 |
| 3,305,623 | 2/1967 | Bakker et al. | 174—35 |

DARRELL L. CLAY, *Primary Examiner.*

U.S. Cl. X.R.

219—10.55; 277—235